(12) United States Patent
Anjum et al.

(10) Patent No.: US 7,496,065 B2
(45) Date of Patent: *Feb. 24, 2009

(54) EFFICIENT PICONET FORMATION AND MAINTENANCE IN A BLUETOOTH WIRELESS NETWORK

(75) Inventors: Farooq Anjum, Somerset, NJ (US);
Ravi Jain, Mountain View, CA (US);
Maria Adamou, Halandri (GR)

(73) Assignee: Telcordia Technologies, Inc.,
Piscataway, NJ (US)

(*) Notice: Subject to any disclaimer, the term of this patent is extended or adjusted under 35 U.S.C. 154(b) by 971 days.

This patent is subject to a terminal disclaimer.

(21) Appl. No.: 10/298,506

(22) Filed: Nov. 19, 2002

(65) Prior Publication Data

US 2003/0099212 A1 May 29, 2003

Related U.S. Application Data

(60) Provisional application No. 60/334,335, filed on Nov. 29, 2001.

(51) Int. Cl.
*H04Q 7/00* (2006.01)
(52) U.S. Cl. .................. 370/328; 370/329; 370/338; 370/331; 455/436; 455/442; 455/466; 455/420
(58) Field of Classification Search ............... 370/328, 370/329, 338, 331; 445/446, 422.1; 455/420, 455/446, 422.1, 436, 442
See application file for complete search history.

(56) References Cited

U.S. PATENT DOCUMENTS

| | | | | |
|---|---|---|---|---|
| 5,448,758 | A * | 9/1995 | Grube et al. ............... | 455/503 |
| 6,744,753 | B2 * | 6/2004 | Heinonen et al. ........... | 370/338 |
| 6,912,375 | B2 * | 6/2005 | Fujii ..................... | 455/67.7 |
| 7,146,636 | B2 * | 12/2006 | Crosbie .................. | 726/7 |
| 2002/0151275 | A1 * | 10/2002 | Trost et al. .............. | 455/41 |
| 2008/0037495 | A1 * | 2/2008 | Anjum et al. ............. | 370/338 |

* cited by examiner

*Primary Examiner*—Nghi H Ly
(74) *Attorney, Agent, or Firm*—Philip J. Feig (57) ABSTRACT

The invention is addressing the problem of efficient formation and maintenance of piconets with assistance from the master of an already existing piconet. The master of an existing piconet initiates the formation of a new helper piconet by at least two of its slaves. One of the slaves of the existing piconet becomes the master of the newly formed helper piconet and the other slave becomes a slave of the helper piconet. This process can be used to expand the number of Bluetooth devices that can use an Internet access point. It can also be used to permit two slave devices to communicate directly with one another so as not to unnecessarily use bandwidth available through the master. Finally, the method and system could be used to provide a method of efficient hand-off from one piconet to another.

4 Claims, 8 Drawing Sheets

EFFICIENT PICONET FORMATION AND MAINTENANCE IN A BLUETOOTH WIRELESS NETWORK

RELATED APPLICATIONS

The present application claims the benefit of U.S. Provisional Application No. 60/334,335 filed Nov. 29, 2001 and entitled "Efficient Piconet Formation And Maintenance Techniques In Bluetooth Environments."

FIELD OF THE INVENTION

The present invention relates generally to wireless communication systems. More specifically, it relates to a method of forming and maintaining groups of Bluetooth devices in a Bluetooth wireless network.

BACKGROUND OF THE INVENTION

Bluetooth technology provides a low-power, low-cost, short-range wireless communication solution operating in the 2.4 GHz ISM band. Small portable devices designed to operate with Bluetooth technology are able to connect to each other and communicate in an ad-hoc fashion with nominal speeds of up to 1 Mbps.

Every Bluetooth device has a unique device address. A set of communicating Bluetooth devices form a group called a piconet, which has one device operating as a master and up to seven devices actively functioning as slaves at any given time. Each of these seven slaves has an address allocated by the master called the active address. Slaves that are active in a piconet (i.e., capable of engaging in a session with the master) are assigned a 3-bit temporary address called an active address. Because the address 000 is not used for slaves, at most seven slaves can be active at any given time; other slaves must be in the park mode. As Bluetooth prices drop and the technology becomes widely deployed this constraint on active addresses will become a limitation in some situations.

A master can communicate with any slave in its piconet, but slaves can communicate directly only with the master. Multiple piconets can exist collocated in space. Two or more piconets, which overlap partially in space and in time, are said to constitute a scatternet.

A mobile device that is functioning as a slave in one piconet might move to another piconet on account of its mobility. Such a device in order to join an existing piconet (with itself as the slave) has to potentially go through two consecutive phases namely that of inquiry and paging. During inquiry the master transmits a series of inquiry packets, in response to which the (potential) slaves reply with a Frequency Hop Synchronization (FHS) packet that contains the information necessary for the master to initiate a connection with the slave. The slave device is also capable of listening to only inquiry packets with special access codes so as to allow it to connect only to a special class of devices, i.e., the devices which act as the master once the piconet is formed.

During the paging phase the master sends to the potential slaves its own FHS packet, containing the address and the clock information of the master. A device that just desires to join an already existing piconet as a slave simply listens for the inquiry and paging packets from the master of the piconet and responds appropriately. Both these states can take as long as 10 seconds to complete. The current practice is for every device that wants to join or form a new piconet to take initiative on its own to do so.

Bluetooth does not allow slaves within a piconet to talk directly to each other; they must either set up a second piconet (with one of them as the master) or communicate in the existing piconet by relaying packets via the master. The former can be very time consuming, taking over 10 seconds if both the inquiry and paging phases are required. The latter wastes piconet bandwidth, causing other slaves to suffer, consumes resources at the master, and causes unnecessary delay.

Bluetooth permits a slave to migrate from one piconet to another. However, when it does so, it might need to carry out the Inquiry and Paging steps, in order to synchronize with and join the master in the new piconet. But this process can take a very long duration (approximately about 10 seconds). Thus, this approach does not lead to seamless handoffs.

BRIEF SUMMARY OF THE INVENTION

The present invention addresses the problem of efficient formation and maintenance of piconets with assistance from the master of an already existing piconet. In the present invention the master of an existing piconet initiates the formation of a new piconet by its slaves. This not only will help in minimizing the time required to form a new piconet but also leads to efficient participation of the slave in multiple piconets. The method and system enables formation of a helper piconet by one of the slaves in the original piconet whereby the slave becomes the master of the helper piconet and communicates with the master of the original piconet.

The formation of the helper piconet will enable more than seven slave devices to communicate through one access point to the Internet due to the ability of the helper piconets to communicate with the master/access point of the original piconet.

Additionally, formation of the helper piconet will enable more efficient hand-off of a slave from one piconet to another.

Finally, the formation of a helper piconet will also enable the direct communication of slave devices.

BRIEF DESCRIPTION OF THE DRAWINGS

An embodiment of the invention will now be explained with reference to the accompanying drawings, in which.

DETAILED DESCRIPTION OF THE INVENTION

Figure 1:
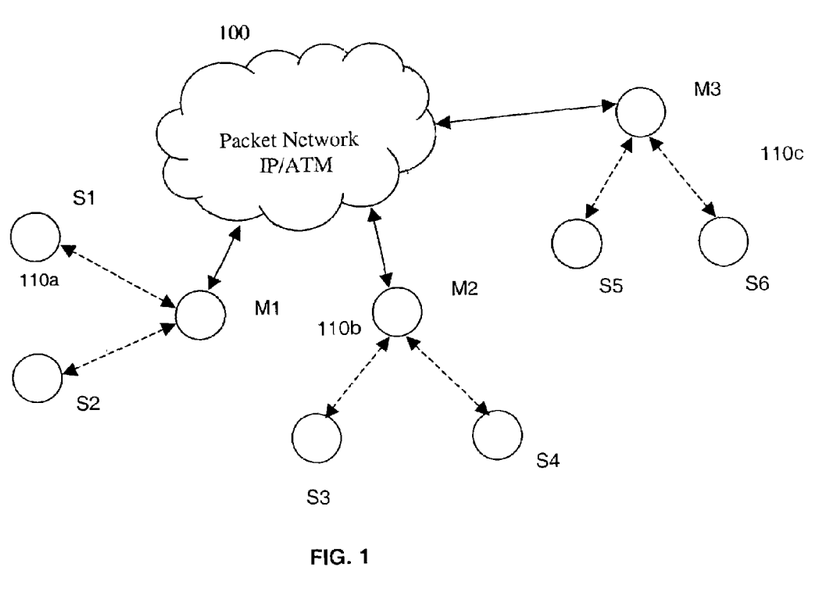
FIG. 1 depicts a Bluetooth network with master and slave devices in various piconets connected to a packet network via the master access points.

In FIG. 1 a system with a fixed number of Bluetooth enabled master devices acting as access points to a packet network is depicted. These master devices M1, M2 and M3 are acting as access points to a packet network such as the Internet or a virtual private network (VPN) over wireline links as shown in FIG. 1. Other Bluetooth devices will connect to the master access points (APs) either directly or indirectly as slave devices. In FIG. 1 there are two slave devices S1 and S2 connected to the master access point M1 in a first piconet 110a, and likewise two slave devices S3 and S4, and S5 and S6 are connected to each of the other two master/access points M2 and M3 respectively to form two additional piconets 110b and 110c. For simplicity each master/access point M1, M2 and M3 is the master of its piconet. The master/access points use a dedicated inquiry access code that allows a device to connect to the access point when desired.

The current implementation of Bluetooth technology has several limitations that are overcome by the present invention that addresses these limitations. Slaves that are active in a piconet (i.e., capable of engaging in a session with the master) are assigned a 3-bit temporary address called an active address. Because the address 000 is not used for slaves, at most seven slaves can be active at any given time and any other slaves must be in the park mode. As Bluetooth prices drop and the technology becomes widely deployed this constraint on active addresses will become a limitation in some situations, particularly in situations in which Bluetooth technology is used as in FIG. 1 as an access point to the Internet or other network.

Figure 2:
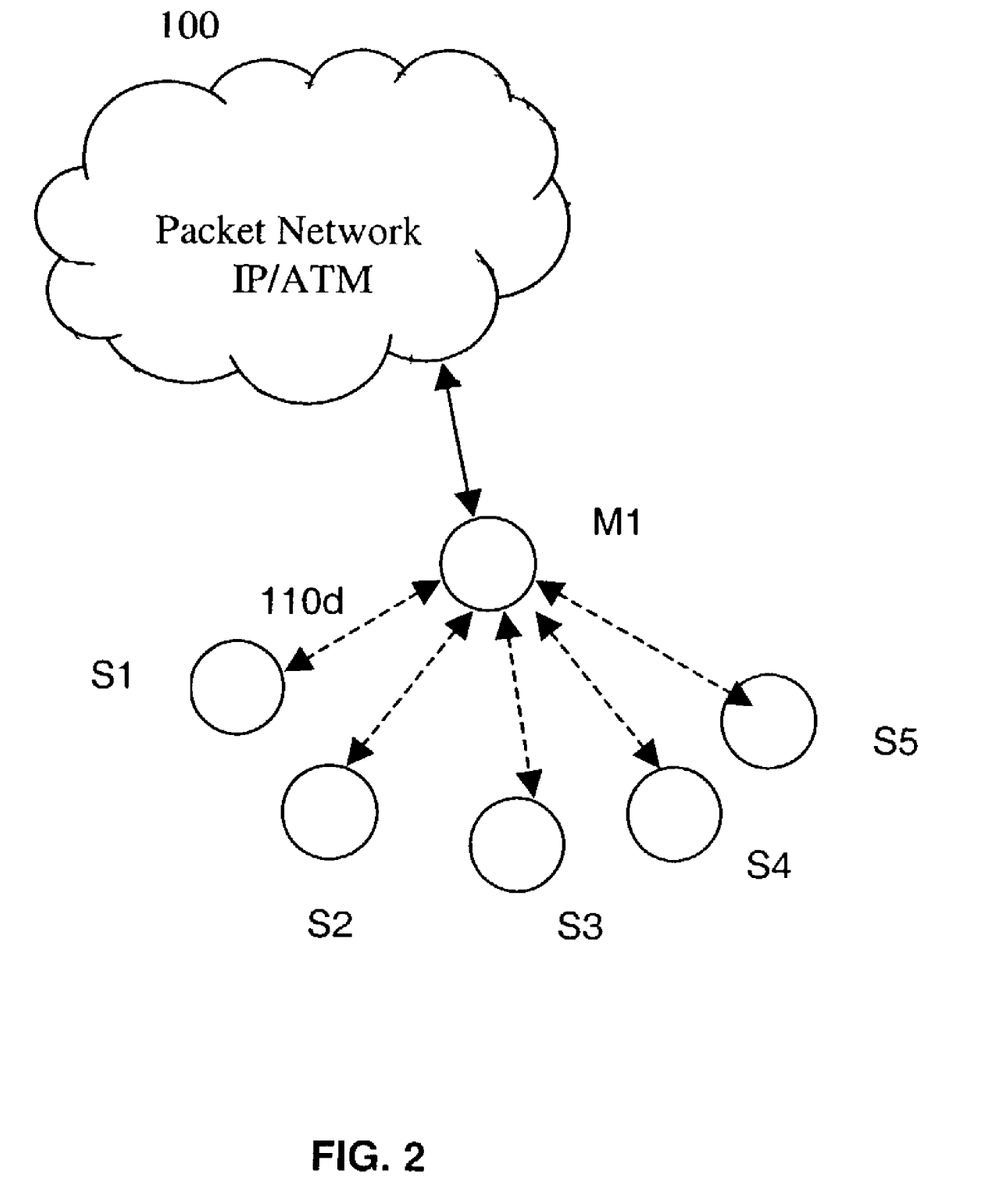
FIG. 2 depicts a Bluetooth network wherein the piconet is near capacity in terms of the number of active slaves allowed in the piconet.

In the present invention the current limitations are overcome by enabling the master of an existing piconet to assist in the formation of a helper piconet. Referring to FIG. 2, slaves S1, S2, S3, S4 and S5 form a piconet 110d with master device/access point M1. Piconet 110d is in a piconet where only a few temporary addresses remain. If more then an additional two slave devices join the piconet one or more of the slaves will need to be placed in park mode. To overcome this, the master device/access point M1 can decide to request one of the slave devices to set up a helper piconet given the fact that very few active addresses remain. The helper piconet is an auxiliary piconet containing one or more of the slave devices, where one slave acts as a bridge between the existing piconet and the helper piconet, forwarding packets from the master device to the other slaves.

Figure 3:
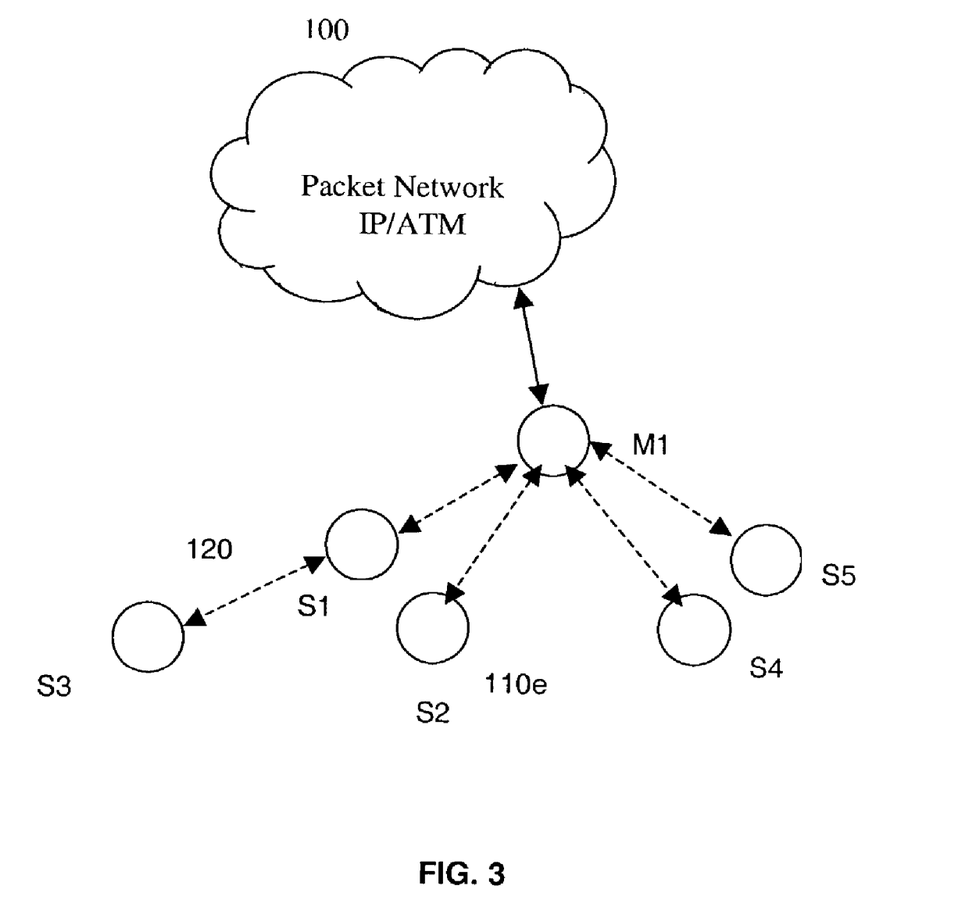
FIG. 3 depicts a Bluetooth network with a helper piconet formed with a former slave as the master.

FIG. 3 depicts this modified piconet/helper piconet in which helper piconet 120 is formed with slave S1 acting as the bridge between the original existing piconet 110e and the helper piconet 120. As a result of the successful formation of the helper piconet, the active address of slave S3 in the original piconet can be released and can be used by other devices. The master M1 can migrate more of its active slaves S2, S4 and S5 to helper piconet 130. Thus, more than seven devices can access the Internet via a single access point such as M1 at any given time.

In a Bluetooth system two slaves within a piconet are not able to talk directly to each other. They must either set up a second piconet (with one of them as the master) or communicate in the existing piconet by relaying packets via the master. The former can be very time consuming, taking over 10 seconds if both the inquiry and paging phases are required. The latter wastes piconet bandwidth, causing other slaves to suffer, consumes resources at the master, and causes unnecessary delay.

Figure 4:
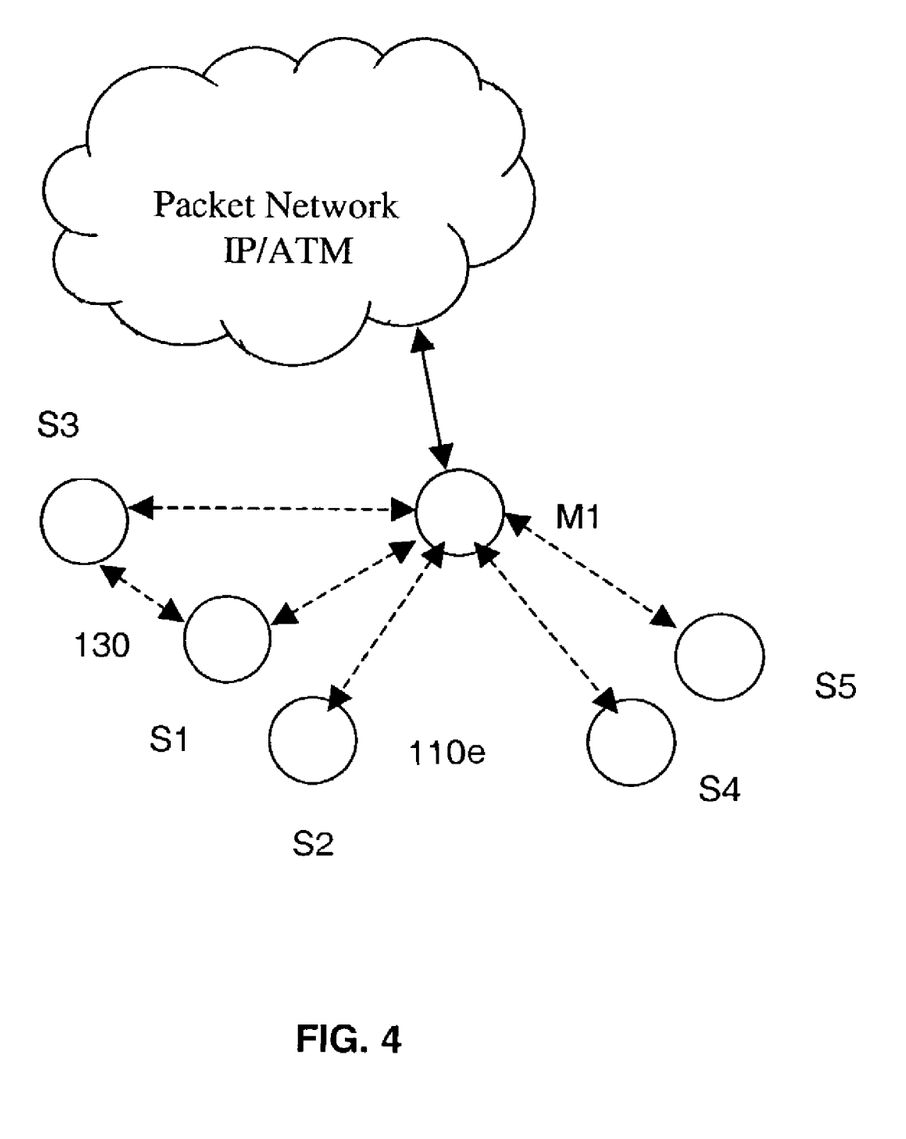
FIG. 4 depicts a Bluetooth network having a helper piconet between slaves that desire to have direct communication.

In the present invention this problem is overcome when the master device assists in setting up a helper piconet 130 as depicted in FIG. 4 containing the slaves that desire to have direct communication using one slave as the helper piconet 130 master and the other as the helper piconet 130 slave. This saves bandwidth, master resources, and reduces delay. Both slaves must alternately, and at precisely determined times, participate in both the original and the helper piconet if they wish to enjoy the benefits of direct talk while continuing to communicate with other entities via the master access point. Note that the use of the helper piconet here differs from standard formation of a second piconet because with the master assisting in the formation of the helper piconet, the delay in having the two devices communicating directly is substantially reduced.

Bluetooth technology permits a slave to migrate from one piconet to another. However, when it does so, it might need to carry out the inquiry and paging steps, in order to synchronize with and join the master in the new piconet. This process can take a very long duration up to approximately 10 seconds. Thus, this approach does not lead to timely and seamless handoffs.

Figure 5:
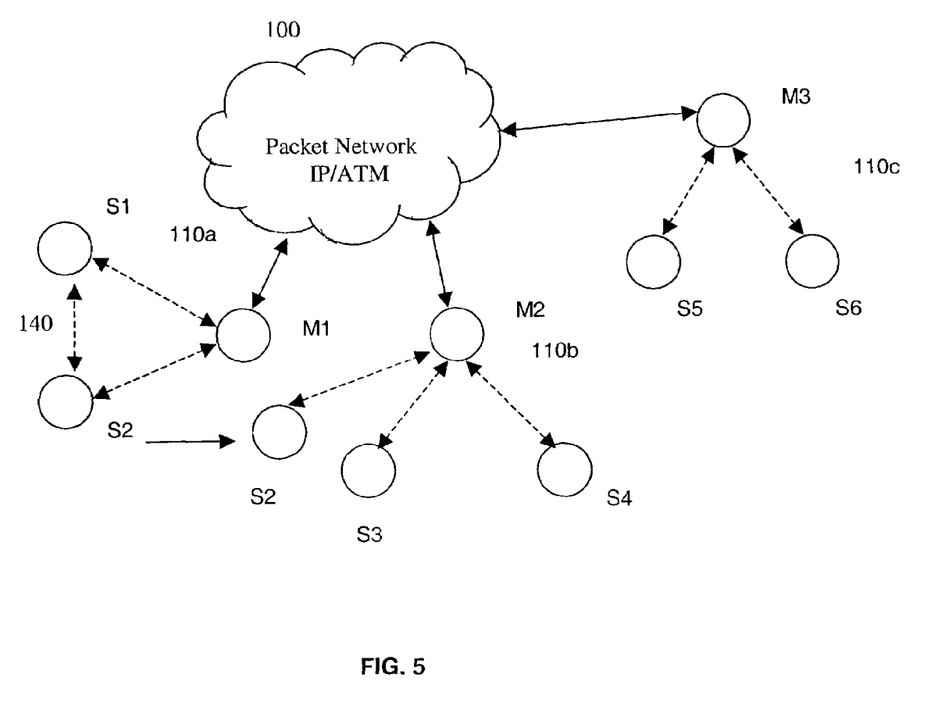
FIG. 5 depicts a Bluetooth network using a sleeper piconet to complete a fast handoff between piconets.

The present invention can overcome this inefficiency in handoffs between Bluetooth networks. Referring back to FIG. 1 and to FIG. 5, in the present invention a slave device, for example S2 may move from a piconet 110a with master device M1 to another piconet 110b with master device M2. Piconet 110a having master M1 also contains another slave device S1. Before slave device S2 moves, it indicates that it is a mobile slave to the master device M1. Master device/access point M1 then assists in forming a helper piconet between slave devices S1 and S2, where slave device S2 is a slave in the helper piconet 140 and slave device S1 is the master. Slave devices S1 and S2 alternate between the original and helper piconets so as to keep their clocks synchronized in the helper piconet and to continue to communicate with other entities via master device/access point M1. No user data is exchanged in the helper piconet 140 until slave S2 moves out of range of master M1 thus it is also referred to as a sleeper or sleeper piconet. At that point, slave S1 becomes a bridge for relaying messages from master M1 to slave S2 via the sleeper piconet until slave S2 joins the new piconet 110b with master M2. Because the helper piconet is already set up there is little delay before slave S1 can begin relaying packets to slave S2, and thus the sleeper piconet assists in smoother handoffs. The master must judiciously choose the slave acting as the bridge node so as to ensure that the bridge node continues to exist throughout the hand-off.

The concept of a sleeper piconet itself is equivalent to pre-reserving resources in neighboring cells before moving, as has been widely investigated in the wireless networking community. While this is problematic in case of cellular networks because of the limited communication channels (e.g. frequencies) in cellular networks, using sleepers in Bluetooth does not consume an entire communication channel and hence other devices do not suffer. Instead, the sleeper's resource consumption is minimal: some at setup time (and that too only for the devices concerned), and some small impact for maintenance. Below is a description for each solution scenario in turn how helper and sleeper piconets are formed in terms of the signaling messages and master operations required. Because the current Bluetooth specification does not have all the signaling messages required, it would have to be extended with new messages or parameters at the Link Manager Protocol (LMP), baseband and host controller interface (HCI) levels.

Consider a piconet such as that in FIG. 3 where the master device M1 instructs two slaves, S1 and S3, to form an auxiliary helper piconet, with slave S3 being the slave that will remain a slave in the helper piconet and slave S1 being the bridge node that will forward packets from the master M1 to slave S3. The master may do this either because a new slave arrives and breaks the seven-slave limit or in advance of that limit so as to allow new slaves to enter the piconet. This is referred to as address expansion. In the following example the latter is assumed for simplicity.

Figure 6:
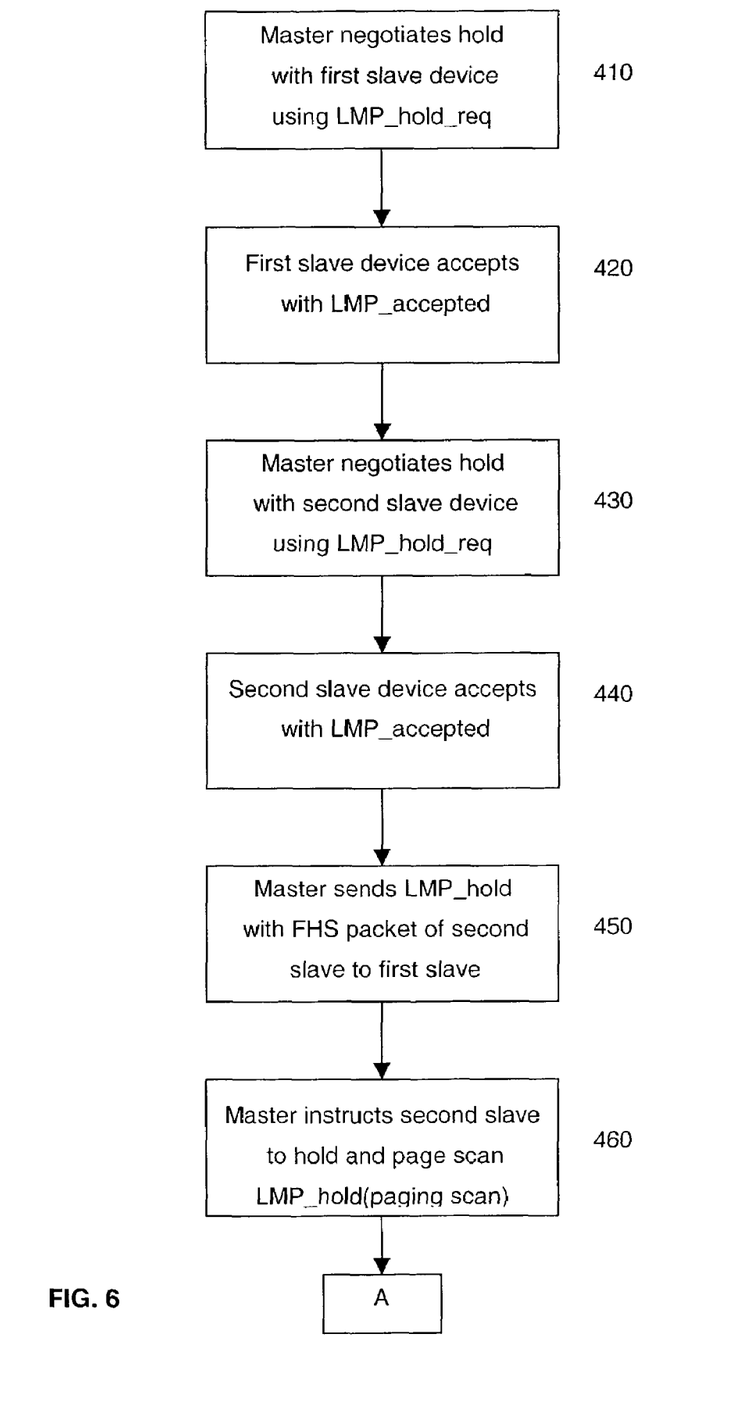
FIGS. 6 and 7 are flow diagram depicting the process for forming a helper piconet; and, FIG. 8 is a flow diagram depicting the process for completing a fast handoff using a sleeper piconet.
Figure 7:
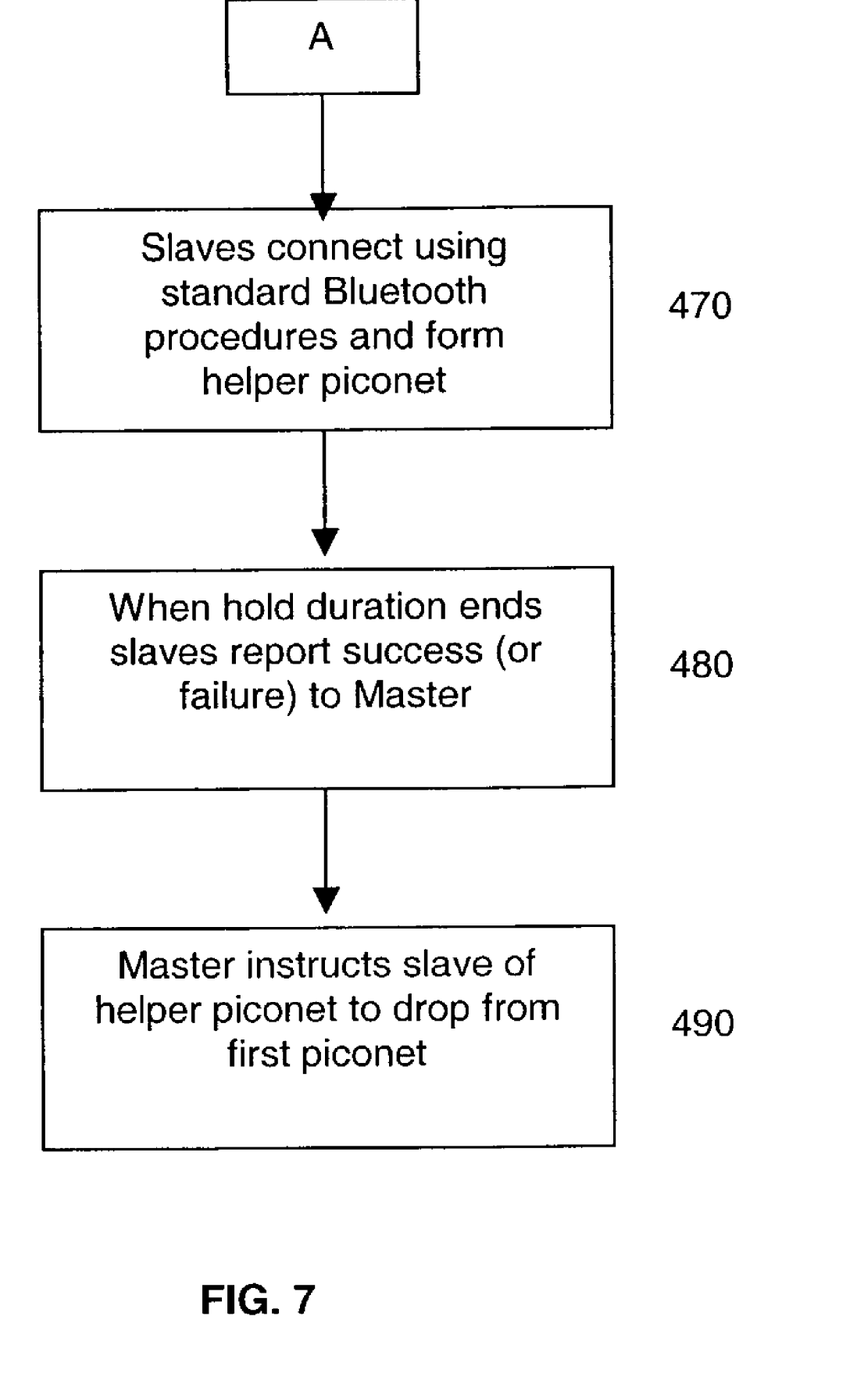

The sequence of signaling operations is as follows. The call flow for setting up a helper piconet is shown in FIGS. 6 and 7. In the call flow, master M1 is the master using the Bluetooth Link Manager to communicate with slaves S1 and S3 respectively. First at steps 410 and 420 master M1 uses an LMP_hold_req command to negotiate with slave S1 a hold duration step, i.e., the time that it will remain inactive in the original piconet so as to form the helper piconet, as well as the hold instant, i.e., the future time instant that it will be required to go on hold. When the negotiation succeeds slave S1 returns an LMP_accepted message as shown in step 420. At steps 430 and 440 the same is done with slave S3. When the hold instant occurs, the master M1 instructs slave S1 (the helper piconet's potential master) to go on hold in the original piconet and enter the paging phase as shown by in step 450 in FIG. 6. This is a new message that would have to be added to the existing Bluetooth specification. The master M1 sends this instruction using the LMP_hold message extended with a parameter containing the Frequency Hop Synchronization (FHS) packet of slave S3. Similarly, the master M1 instructs S3 to go on hold in the original piconet and enter the paging scan phase. This occurs at step 460 in FIG. 6. The LMP_hold(paging scan) message is also a new Bluetooth message. At step 470 slaves S1 and S3 connect with each other using standard Bluetooth procedures and form the helper piconet. At step 480 when the hold duration ends both slaves S1 and S3 return to the original piconet and report success to master M1. At step 490 master M1 instructs slave S3 to leave the original piconet. Slave S3 now becomes active only in the helper piconet and the setup of the helper piconet is complete. The bridge node slave S1 stays in the original existing piconet and receives packets destined both for itself and for slave S3. Periodically master M1 negotiates with slave S1 a new hold duration and hold instant to allow the bridge node slave S1 to rejoin the helper piconet and deliver packets to slave S3.

It is clear that this procedure potentially incurs additional computation overhead at the master as well as additional bandwidth overhead for setting up the helper piconet and delay to deliver packets to slaves such as S3 only active on the helper piconet. For the system architecture the master load is not significant. If a helper piconet were to be created without use of the present invention, i.e., if the master did not provide assistance, several complications arise. Firstly, both slaves would have to determine that the appropriate threshold for active slaves in the piconet has been reached and request the master to put them on hold, at a common hold instant. Secondly, in the hold duration the slaves would have to be in complementary phases, i.e., one in paging (or inquiry) and the other in page scan (or inquiry scan), or otherwise a prohibitively long delay would occur. Thirdly the bridge node/slave would have to (periodically) determine when it should rejoin the helper piconet, and do so without any knowledge of the master's scheduling.

Consider two slaves S1 and S3 in a piconet with a master M1 that wish to communicate directly in addition to their existing communications sessions where they receive packets from master M1. This is referred to as "direct talk". Helper piconet formation with master assistance would proceed as follows. Slave S1 informs master M1 via a Logical Link Control and Adaptation Protocol (L2CAP) message that it wishes to communicate with slave S3. After following standard Bluetooth procedures for name and address resolution (if required), the HCI layer in master M1 requests lower layers in the master to put slaves S1 and S3 on hold simultaneously. Subsequently, the sequence of steps set forth in FIGS. 6 and 7 is carried out so that slaves S1 and S3 form a helper piconet, with S1 as the bridge node. However, when slaves S1 and S3 return to the original piconet and report success to master M1, both stay active in the original piconet. Up to this point the procedure is the same as that set forth in FIGS. 6 and 7. After this, however, master M1 does not ask slave S3 to leave the original first piconet at step 490. Slaves S1 and S3 simply communicate directly with each other in the helper piconet and then return as active slaves in the original piconet. Periodically master M1 negotiates with slaves S1 and S3 a new hold duration and hold instant to allow both nodes to rejoin the helper piconet and exchange packets.

If direct talk between slaves were to be implemented without our invention, i.e., without master assistance, several problems would arise. As with address expansion case, slaves S1 and S3 have to go on hold at the same instant and for a mutually agreed, sufficiently long duration. In addition, when the helper piconet is being set up slaves S1 and S3 would have to be in complementary phases and subsequently would have to (periodically) determine when they should rejoin the helper piconet, and do so without any knowledge of the master's scheduling. While direct talk is in principle possible without master assistance, it is greatly facilitated by the master.

In the case of a handoff, slave S2 may move from a piconet with master M1 as depicted in FIG. 1 that also contains slave node S1, to another piconet with master M2. Master M1 then assists in forming a helper (or in this case specifically a sleeper) piconet between S1 and S2, where S2 is a slave in the helper/sleeper piconet and slave S1 is the master of the helper/sleeper piconet. This is referred to as a "fast handoff" scenario. Slaves S1 and S2 alternate between the original and sleeper piconets so as to keep their clocks synchronized in the sleeper piconet and to continue to communicate with other entities via M1 using the original piconet. No user data is exchanged in the helper/sleeper piconet until slave S2 moves out of range of master M1. At that point, slave S1 becomes a bridge for relaying messages from master M1 to slave S2.

Figure 8:
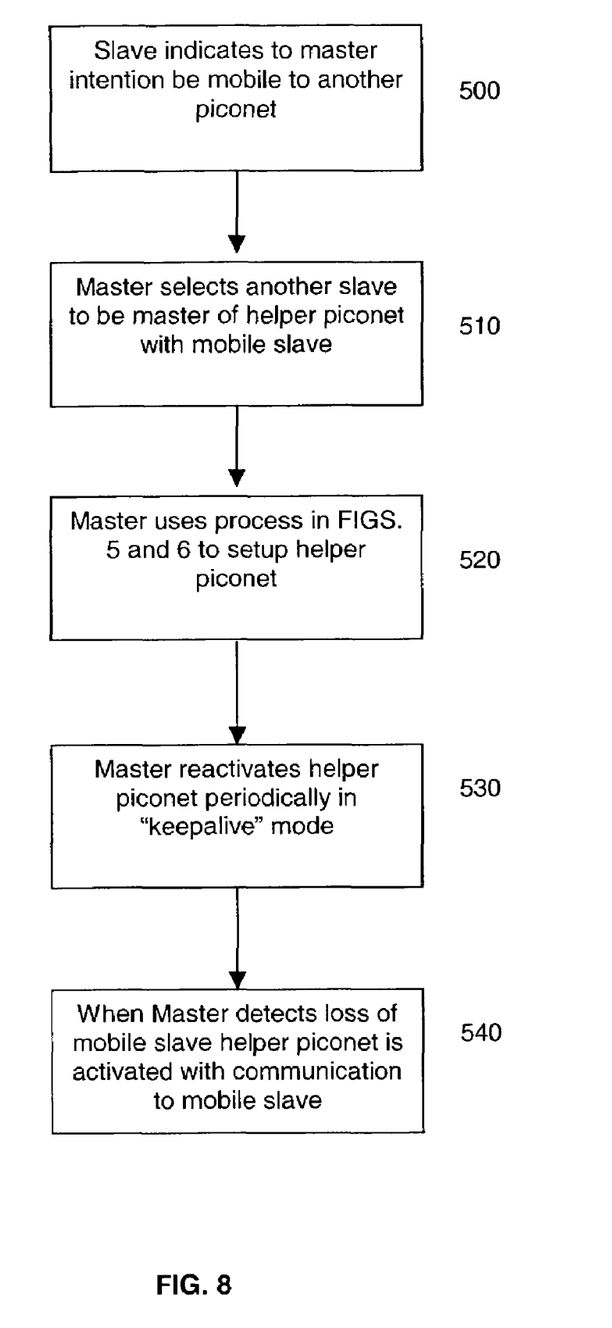

At step 500 in FIG. 8, slave S2 informs master M1 that it is (potentially) mobile. At step 510 master M1 selects an existing slave, say S1, to help smooth S's handoff when it occurs. Step 520 of FIG. 8 incorporates most of the procedures of FIGS. 6 and 7 related to the address expansion and direct talk cases. The master negotiates hold durations and instants with slaves S1 and S2 and then instructs them to go on Hold, in complementary phases. Slaves S1 and S2 set up the sleeper piconet as before, and return to the original piconet to report success to master M1. Unlike address expansion, in fast handoff slave S2 is not immediately asked to leave the original piconet once the sleeper piconet is setup. Like direct talk, the master M1 (periodically) negotiates a hold duration and instant when slaves S1 and S2 rejoin the sleeper piconet. Unlike direct talk, however, at step 530 slaves S1 and S2 rejoin the sleeper piconet only to exchange brief signaling messages ("keepalive" messages) to remain in clock synchronization and to keep the sleeper piconet operational. Thus, the period between rejoining can be fairly long and the duration in the sleeper piconet can be fairly short. So far, the call flows corresponding to this scenario are indistinct from the earlier cases.

When slave S2 starts moving it detects that the link to master M1 is lost due to the expiry of the standard Bluetooth LMP link supervision timer pr other means. At step 540 as master M1 detects the same, it then instructs S1 to join the sleeper and connect with S2. Once slave S1 does so it becomes a bridge and relays messages from master M1 to slave S2 as with address expansion. This continues until slave S2 successfully joins the piconet of another master such as M2. Slave S2 then informs master M1 (via a signaling message from M2 to M1 over the wired network) and/or S1 (via a signaling message in the helper/sleeper piconet) that it has done so, at which point slave S2 leaves the helper/sleeper piconet and deletes it from its internal memory, and M1 does likewise.

Note though that if the bridge is not intelligently selected or if the bridge also moves out or becomes inactive then the slave device S2 will not be able to get connectivity. In that case slave device S2 can fall back to the basic Bluetooth mode, at the cost of increased handoff delay. Other solutions are possible, e.g. where more than one sleeper piconet could be set up so as to minimize the probability of this occurring. The bridge slave device may be selected based on the signal strength or on the speed and direction of travel of the mobile slave device.

The above description has been presented only to illustrate and describe the invention. It is not intended to be exhaustive or to limit the invention to any precise form disclosed. Many modifications and variations are possible in light of the above teaching. The applications described were chosen and described in order to best explain the principles of the invention and its practical application to enable others skilled in the art to best utilize the invention on various applications and with various modifications as are suited to the particular use contemplated.

We claim:

1. A method for handing off communication from a first slave in a first piconet, capable of communicating with a network through a first access point that acts as a first master device, to a second piconet, comprising the steps of:
   receiving at the first master device a request from the first slave to transfer to the second piconet;
   selecting a second slave device to be the master device in a sleeper piconet;
   requesting a first slave device and a second slave device in communication with the first master device to become inactive in the first piconet at a predetermined time for a specified duration;
   receiving an acknowledgement at the first master device from the first and second slave devices to become inactive at the predetermined time for a specified duration;
   at the predetermined time, transmitting a command from the first master device to the second slave with connection information for enabling connection to the first slave; wherein once connected as sleeper piconet the second slave acts a master to the first slave and provides a means for the first slave and second slave to synchronize;
   determining at the first master device that the first slave device is beyond the range of the first master device;
   communicating from the first master device to the first slave device through the sleeper piconet by way of the second slave device until such time as the first slave device becomes active in the second piconet.

2. The method of claim 1 wherein the connection information is the frequency hop synchronization (FHS) packet of said second slave.

3. The method of claim 1 wherein the step of selecting the second slave device to act as the master device in the sleeper piconet is based on the speed and/or direction of travel of the first slave device.

4. The method of claim 1 wherein the step of selecting the second slave device to act as the master device in the sleeper piconet is based on the signal strength of the first slave device.

* * * * *